United States Patent [19]

Goodstine et al.

[11] 4,387,667
[45] Jun. 14, 1983

[54] FLUIDIZED BED DISTRIBUTOR PLATE ASSEMBLY

[75] Inventors: Stephen L. Goodstine, Windsor; Glen D. Jukkola, Wethersfield, both of Conn.

[73] Assignee: Combustion Engineering, Inc., Windsor, Conn.

[21] Appl. No.: 330,291

[22] Filed: Dec. 14, 1981

[51] Int. Cl.³ .................. F22B 1/00; F26B 3/08; F26B 17/00; F16K 15/04
[52] U.S. Cl. ........................ 122/4 D; 34/57 A; 34/54; 110/245; 432/58; 137/533.11
[58] Field of Search ............. 110/245; 122/4 D; 34/54, 57 A, 57 B; 432/15, 58; 137/533.11

[56] References Cited

U.S. PATENT DOCUMENTS

| | | | |
|---|---|---|---|
| 3,386,182 | 6/1968 | Lippert | 34/57 A |
| 3,896,560 | 7/1975 | Knepper | 34/57 A |
| 3,921,663 | 11/1975 | Beranek et al. | 34/57 A |
| 3,924,402 | 12/1975 | Harboe | 122/4 D |
| 4,068,389 | 1/1978 | Staffin et al. | 34/57 A |
| 4,096,909 | 6/1978 | Jukkola | 122/4 D |
| 4,107,851 | 8/1978 | Takacs et al. | 34/57 A |
| 4,115,929 | 9/1978 | Staub et al. | 34/57 A |
| 4,150,632 | 4/1979 | Matthews | 122/4 D |
| 4,253,247 | 3/1981 | Bergstrom | 34/54 |
| 4,257,171 | 3/1981 | Johnson et al. | 34/57 A |

*Primary Examiner*—Henry C. Yuen
*Attorney, Agent, or Firm*—Robert L. Olson

[57] ABSTRACT

A fluidized bed furnace (10) for generating steam (26) is designed to operate over a given load range, for example from 50% of full load to maximum capacity rating (MCR). The air distributor (12) is designed with a constant pressure drop restriction means or "float" (36) in each air inlet (18). As the load varies, the pressure drop across the float (36) will remain constant, reducing the overall fan horse power requirements.

4 Claims, 2 Drawing Figures

FLUIDIZED BED DISTRIBUTOR PLATE ASSEMBLY

BACKGROUND OF THE INVENTION

One way of burning coal cleanly is in a fluidized bed furnace, where the coal is burned in a bed of inert material such as limestone. These units must be capable of operating at some reduced load range to follow load demand and to permit normal start-up operation. Conventional air distributors for a fluidized bed are designed with a pressure drop equal to about ⅓ of the bed pressure drop to ensure uniform distribution of air over the cross section of the bed. Since the combustor or furnace is normally designed to operate over some range of load, the distributor must be sized to give the desired pressure drop at the minimum load. As a result, when load is increased to maximum, the distributor pressure drop increases over and above the pressure needed for good air distribution. The pressure drop increases with the square of the velocity through the distributor. Thus a distributor designed for four inches water pressure drop at 50% load, will have a pressure drop of sixteen inches water at MCR, or 100% load. This increases the capitol cost of the unit since the fan must be sized for full load conditions. It also greatly increases the power requirements for operating the fan during the lifetime of the unit.

SUMMARY OF THE INVENTION

A fluidized bed furnace for generating steam is provided, and is designed to operate over a given load range, for example from 50% full load to MCR. The air distributor has openings therein containing "floats" having constant pressure drop. As the load varies, the pressure drop across the floats remains constant, reducing the overall fan horsepower requirements.

DESCRIPTION OF THE PREFERRED EMBODIMENT

Figure 1:
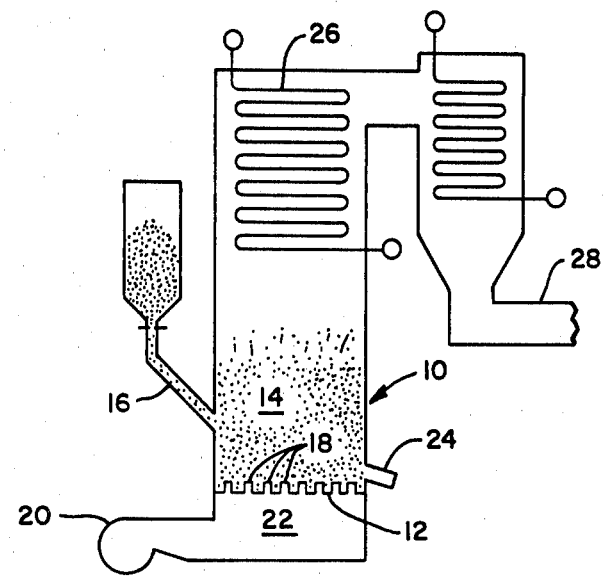
FIG. 1 is a sectional elevation of a fluidized bed furnace having an air distributor constructed in accordance with the invention.

Looking now to FIG. 1, numeral 10 denotes a furnace having an air distributor 12 in its lower portion, supporting a fluidized bed of coal and limestone particles 14. The coal and limestone are introduced into the bed through chute 16. The air distributor has a multiplicity of nipples 18 therein, through which the air passes up into the bed from fan 20 and chamber 22. The air is at a sufficient velocity to place the coal and limestone particles in a fluidized state. It also supports combustion of the coal in the fluidized state. The limestone is for the purpose of combining with sulfur dioxide to form calcium sulfate during the combustion process. Ash is removed from the bed through discharge 24. The hot combustion gases leaving the bed 14 pass over heating surface 26, where steam is generated and superheated. The gases are discharged from the unit through rear pass 28, after giving up most of its heat to the heat exchange surfaces.

Figure 2:
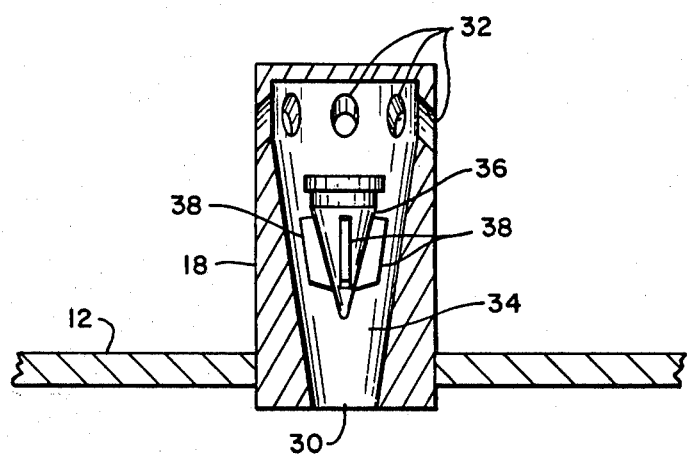
FIG. 2 is an enlarged view of one of the air inlets in the air distributor.

Looking now to FIG. 2, one of the nipples 18 of the air distributor 12 of FIG. 1 is shown in more detail. Each nipple 18 has a restricted inlet or orifice 30 at its lower end, and a plurality of openings 32 at its upper end. The vertical passageway within the nipple has inclined walls 34, forming an expanding passageway from its lower end to its upper end. Located within a passageway is a variable restriction means or "float" 36. The float is designed for size and weight such that when the unit is operating at 50% of full load, the pressure drop across the nipple 18 is sufficient to supply the proper air flow rate to fluidized the bed and support stable combustion of the coal. As the load on the unit increases, more air flows through each nipple 18. This forces the float 36 to rise to a higher level within the nipple due to increased flow velocity, thus increasing the flow area around the float. The pressure drop across the float remains constant, since the flow area increases as the unit load and air flow increases.

The float has four fins 38 along its outer surface. When the float seats on the orifice 30, it is these fins 38 which make contact with the orifice walls. Thus the float can be so designed such that when the float is seated, there is sufficient clearance to permit the minimum required air flow, such as 50% of MCR. With the fins seating in the orifice, there is less likelihood of the float becoming jammed or stuck in its seated position, since there is only point contact between the fins and orifice.

The openings 32 at the top of the nipple 18 are sloped downward to minimize material sifting down into the nipple and jamming the float. The openings 32 are made at an angle greater than the angle of repose of the bed material.

A typical performance of a fluidized bed constructed in accordance with the invention might be as follows: at 50% full load operation, the pressure drop across the orifice 30 would be 0.5 inch water; across the float 36, three inches water; and across the openings 32, 0.5 inch water. This combination yields the desired four inches of pressure drop. At full load, the pressure drop across the orifice 30, and the openings 32 go up by the square. Thus, with air flow doubling, the pressure drop increases four times. The pressure drop across the float 36 remains fairly constant, since the flow passage increases with increased flow. Thus at full load, or MCR, the pressure drop across the orifice 30 would be two inches water; across float 36, three inches water; and across the openings 32, two inches water. A total pressure drop of seven inches water occurs at MCR. If a unit were designed for four inches pressure drop across a fixed orifice at 50% load, it would have a pressure drop of sixteen inches of water at MCR. Thus the invention saves nine inches of pressure drop at MCR. This allows a much smaller fan to be used and saves a considerable amount of power over the operating life of the unit.

We claim:

1. In combination, a fluidized bed including a housing, an air distributor extending across the housing, means for introducing particulate matter onto the upper surface of the air distributor, the air distributor including a flat plate, a plurality of nipples extending upwardly from the upper surface of the plate with passage means extending up through each nipple, each passage means having inner walls forming a frustoconical passage, larger at its upper end, restriction means within each passage means, which restriction means floats freely within the passage in such a manner that as the flow velocity of the air therethrough increases, the restriction means is automatically forced higher in the passage thus increasing the flow area therearound, and keeping the pressure drop across the restriction means fairly constant, each restriction means having a plurality of ribs attached to its outer surface, and the lower inlet walls of each passage means is sized such that the ribs seat in the inlet on point contact therewith.

2. The combination set forth in claim 1, wherein the passage means in each nipple is closed at its top, therebeing a plurality of openings through the side walls of each nipple which are sloped at a downward angle from the passage means such that bed material cannot sift into the nipple.

3. The combination set forth in claim 2, wherein the housing is a furnace, the particulate matter is coal, and the air flowing through the air distributor supports combustion of the coal.

4. The combination set forth in claim 3, wherein the housing contains steam generating surface.

* * * * *